D. E. ROSS.
STEERING GEAR FOR VEHICLES.
APPLICATION FILED SEPT. 18, 1907.
1,059,568.
Patented Apr. 22, 1913.
2 SHEETS—SHEET 1.
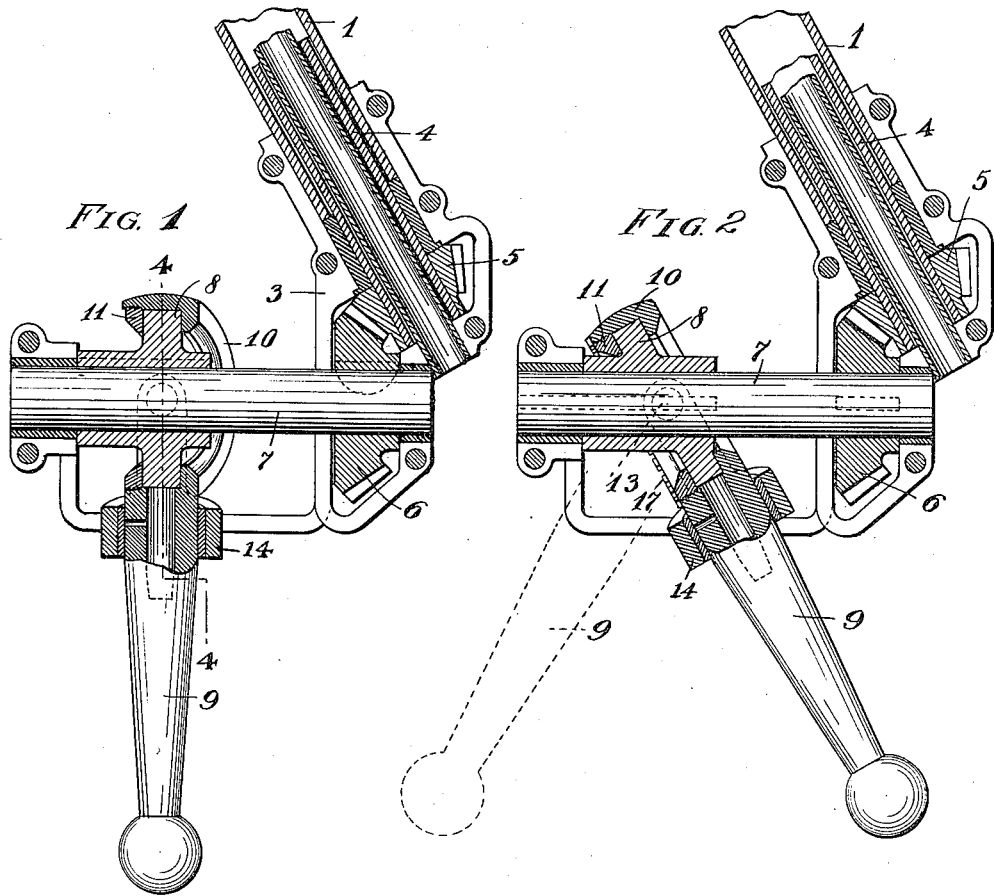
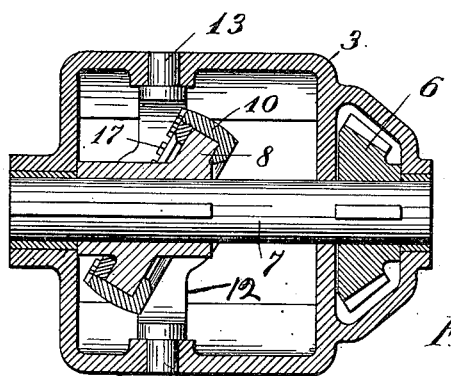
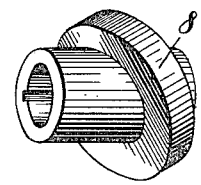
WITNESSES:
INVENTOR,
David E. Ross
BY Bates, Fouts & Hull
ATTYS.

D. E. ROSS.
STEERING GEAR FOR VEHICLES.
APPLICATION FILED SEPT. 18, 1907.
1,059,568.
Patented Apr. 22, 1913.
2 SHEETS—SHEET 2.
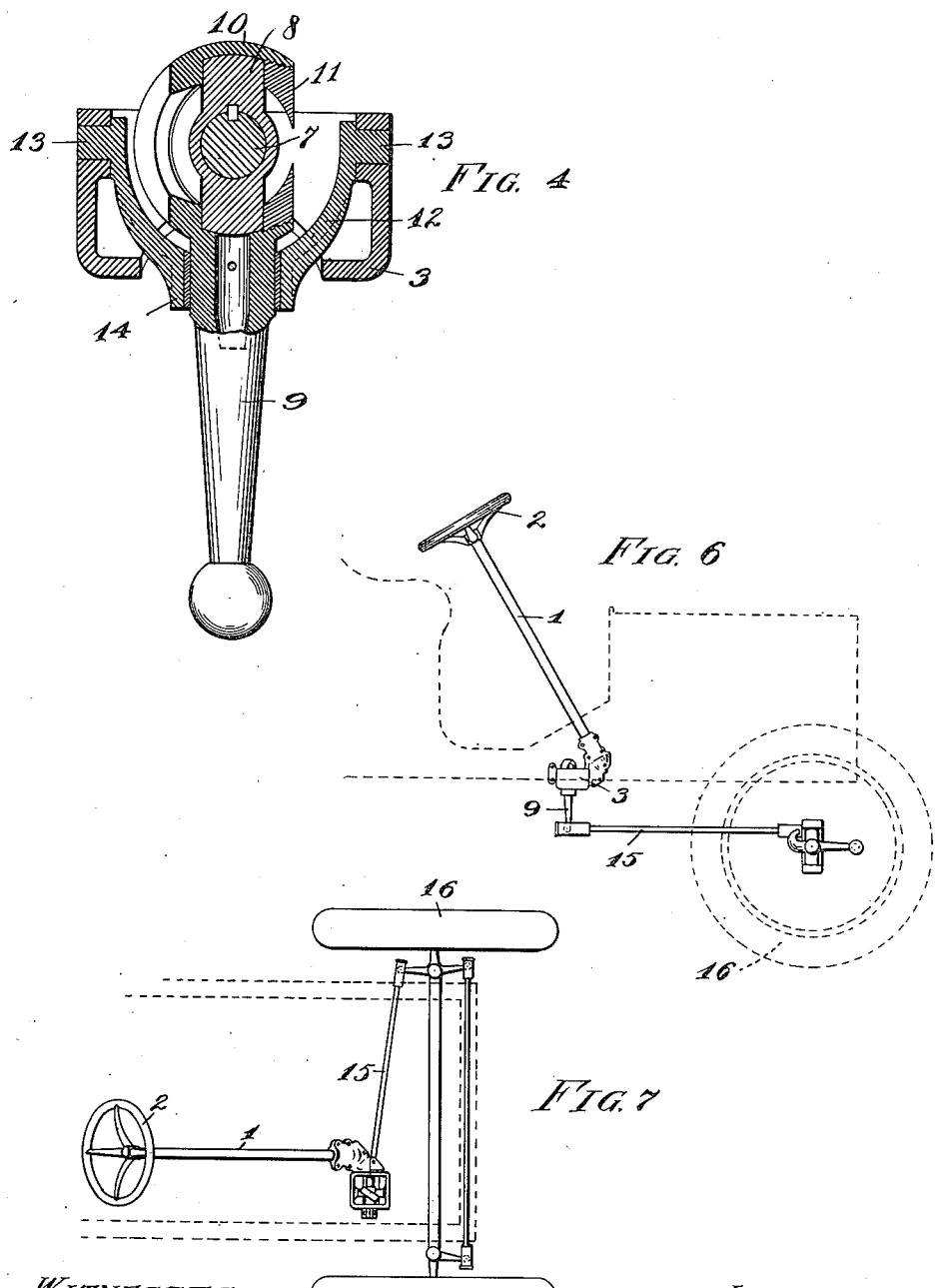
WITNESSES:
INVENTOR,
David E. Ross
BY Bates, Fouts & Hull
ATTYS.

UNITED STATES PATENT OFFICE.

DAVID E. ROSS, OF BROOKSTON, INDIANA, ASSIGNOR TO THE ROSS GEAR AND TOOL COMPANY, OF LA FAYETTE, INDIANA, A CORPORATION OF INDIANA.

STEERING-GEAR FOR VEHICLES.

1,059,568.  Specification of Letters Patent.  Patented Apr. 22, 1913.

Application filed September 18, 1907. Serial No. 393,470.

*To all whom it may concern:*

Be it known that I, DAVID E. Ross, a citizen of the United States, residing at Brookston, in the county of White and State of Indiana, have invented a certain new and useful Improvement in Steering-Gear for Vehicles, of which the following is a full, clear, and exact description, reference being had to the accompanying drawings.

This invention relates to steering mechanism for automobiles or other vehicles, and it has for its object the production of a device of this character which shall be economical in manufacture, efficient in operation and easy of manipulation.

In my former application No. 316,594 I have shown a form of steering gear which provides a positive back-lock, so that no matter what obstruction the front wheels of the vehicle may strike the car will not be diverted from its course. Some makers of the lighter construction of automobiles object to this back-lock for the reason that the construction of their cars is not sufficiently strong to withstand the shock occasioned by striking an obstacle, and they desire that when such an obstacle is thus encountered, the wheels may turn and thereby diminish the shock to the automobile.

My present invention, therefore, is intended to provide a gear which will be sufficiently strong and sensitive for steering purposes and which will not be positively locked against backward movement.

With the above objects in view, I have devised the construction shown in the accompanying drawings, in which—

Figure 1 is a vertical sectional view through the gear showing the steering arm in elevation and in mid position; Fig. 2 is a view similar to Fig. 1, but showing the steering arm at one extreme of its movement, and indicating in dotted lines the steering arm at the other extreme of its movement; Fig. 3 is a horizontal section through the casing in the plane of the rock-shaft; Fig. 4 is a vertical transverse section taken substantially on the line 4—4 of Fig. 1, the steering arm being shown in elevation; Fig. 5 is a perspective view of the nutating or wabbling disk; Fig. 6 is a diagrammatic view showing the steering gear applied to an automobile in such manner as to give a fore-and-aft movement to the steering rod and Fig. 7 is a similar view, in plan, showing the application of the steering gear to an automobile, the steering rod having a transverse movement.

Taking up a more detailed description by reference to the drawings, in which the same reference character designates the same part throughout the several views, 1 represents the tubular steering column, at the upper end of which is carried the hand-wheel, or some other suitable means for turning the steering shaft. The tubular steering column is secured at its lower end within a casing 3 which contains the steering mechanism proper. Journaled within the casing is the steering-shaft 4, to the lower end of which is secured a beveled pinion 5, said pinion meshing with a similar but larger gear 6, that is secured to a horizontal rock-shaft 7, said rock-shaft being also journaled in the casing 3. By making the gear 6 larger than the pinion 5, a definite degree of rotation of the steering shaft will produce a smaller rotation of the shaft 7, by which means the steering shaft may be given a wide turn for producing a comparatively small steering effect, and the power necessary for steering the vehicle is diminished, thereby rendering the steering mechanism more sensitive.

Keyed, or otherwise secured, to the shaft 7 is a nutating or wabbling disk 8, said disk being shown in perspective in Fig. 5. The plane of said disk is inclined to the axis of the shaft 7, so that as said shaft is rocked, the disk will be given a nutating or wabbling motion about the shaft.

The steering arm, which is shown at 9, is provided on the end next the disk with a ring 10 which is similar to the well-known eccentric strap, which ring is made to fit the periphery of the disk 8. The disk is surrounded by the ring, and the latter is held in position by an annular nut 11 which screws into the ring and abuts against the face of the disk, thereby confining the disk between the nut and the integral flange of the ring. For preventing the steering arm 9 from rotating with the shaft 7, and for confining its movement to one plane, I journal in the casing 3 a yoke 12, said yoke having its bearings at points 13 on opposite sides of the shaft 7, the axis of said bearings being in the same plane as the axis of the shaft 7. The yoke 12 has a ring portion 14 at its free end through which extends the steering arm 9 and in which said arm is guided. With this construction it will be understood that, as the disk is rotated, the steering arm will be held from such rotation but will be guided back and forth at its lower end, said end swinging in the arc of a circle about the bearings 13 as a center.

Connected with the lower end of the steering arm is a steering rod 15 that is pivoted to a steering knuckle of the vehicle in the usual manner, such knuckles turning the ground wheels 16 for steering the vehicle. In Fig. 6 I have shown my steering gear as applied to a car in which the steering rod 15 is given a fore-and-aft movement. The gear is not limited to such movement however, as is indicated in Fig. 7, in which the steering rod is given a transverse movement.

In order to prevent the nut 11 from accidental displacement, I provide the same on its outer portion with a series of projections 17 with which any suitable form of detent may be made to engage.

While I have necessarily shown and described one form of mechanism in which the principles of my steering gear may be embodied, the same may be modified in its details, and I desire it to be understood that the following claims are not intended to be limited to such details any further than is made necessary by the specific terms employed therein.

Having described my invention, I claim:

1. In steering mechanism, a steering shaft, a rotatable shaft, beveled gearing connecting the said shafts, the gear on the steering shaft being smaller than that on the rotatable shaft, a nutating disk secured to said rotatable shaft, a steering arm having a part surrounding the nutating disk, an annular nut screwed into said part and holding the same to the disk, and a yoke for confining the movement of the arm to one plane.

2. In steering mechanism, a casing, a rotatable shaft and a steering shaft journaled in said casing, gearing connecting the said shafts, a nutating disk secured to said rotatable shaft, a steering arm having an end surrounding the disk, and a yoke journaled in the casing and having a part surrounding the steering arm for confining the movements of the latter to one plane.

3. In steering mechanism, a casing, a rotatable shaft and a steering shaft journaled in said casing, gearing connecting the said shafts, a nutating disk secured to said rotatable shaft, a steering arm having an end surrounding the disk, an annular nut screwed into said end and holding the same to the disk, and a yoke journaled in the casing on a plane with the axis of the rotatable shaft and having a part surrounding the steering arm for confining the movements of the latter to one plane.

4. In a steering mechanism, the combination of a casing, a shaft journaled at both its ends in said casing, an inclined disk upon the shaft intermediate its ends, a depending arm formed at one end to surround said disk, and a yoke pivoted to the casing and engaging the said arm.

In testimony whereof, I hereunto affix my signature in the presence of two witnesses.

DAVID E. ROSS.

Witnesses:
  EDWARD A. ROSS,
  WILLIAM ROSS.